United States Patent Office 2,993,338
Patented July 25, 1961

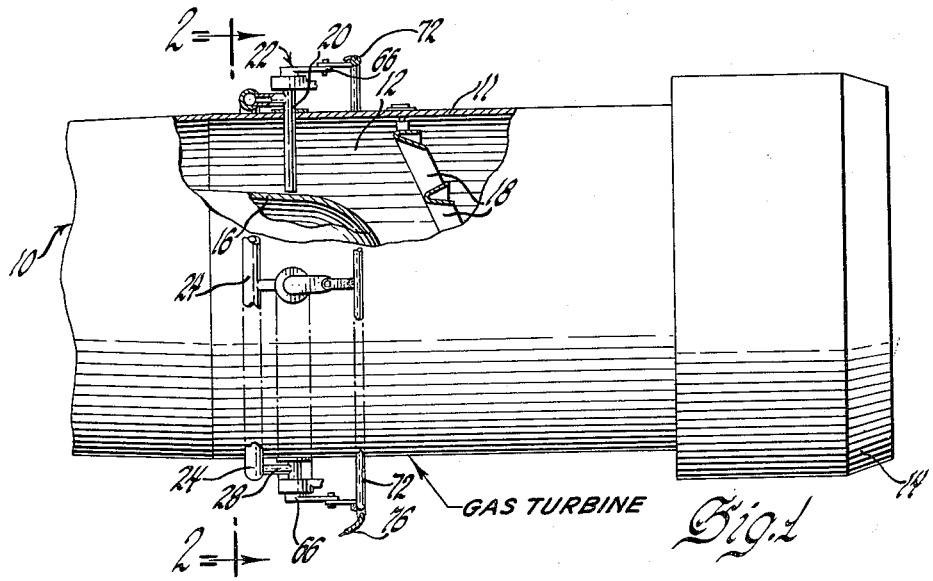
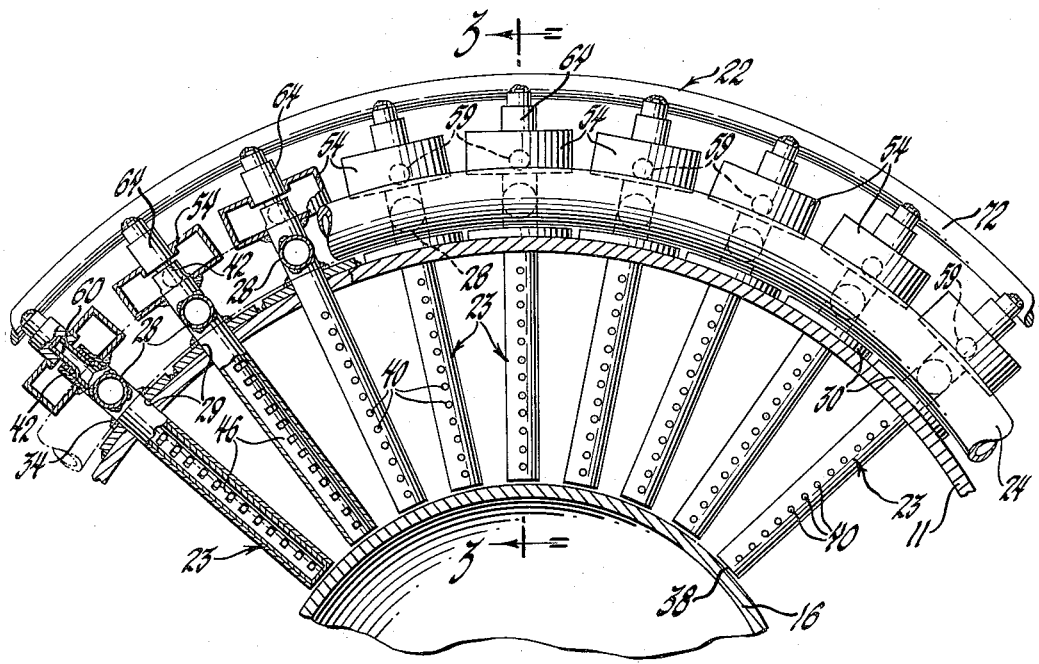

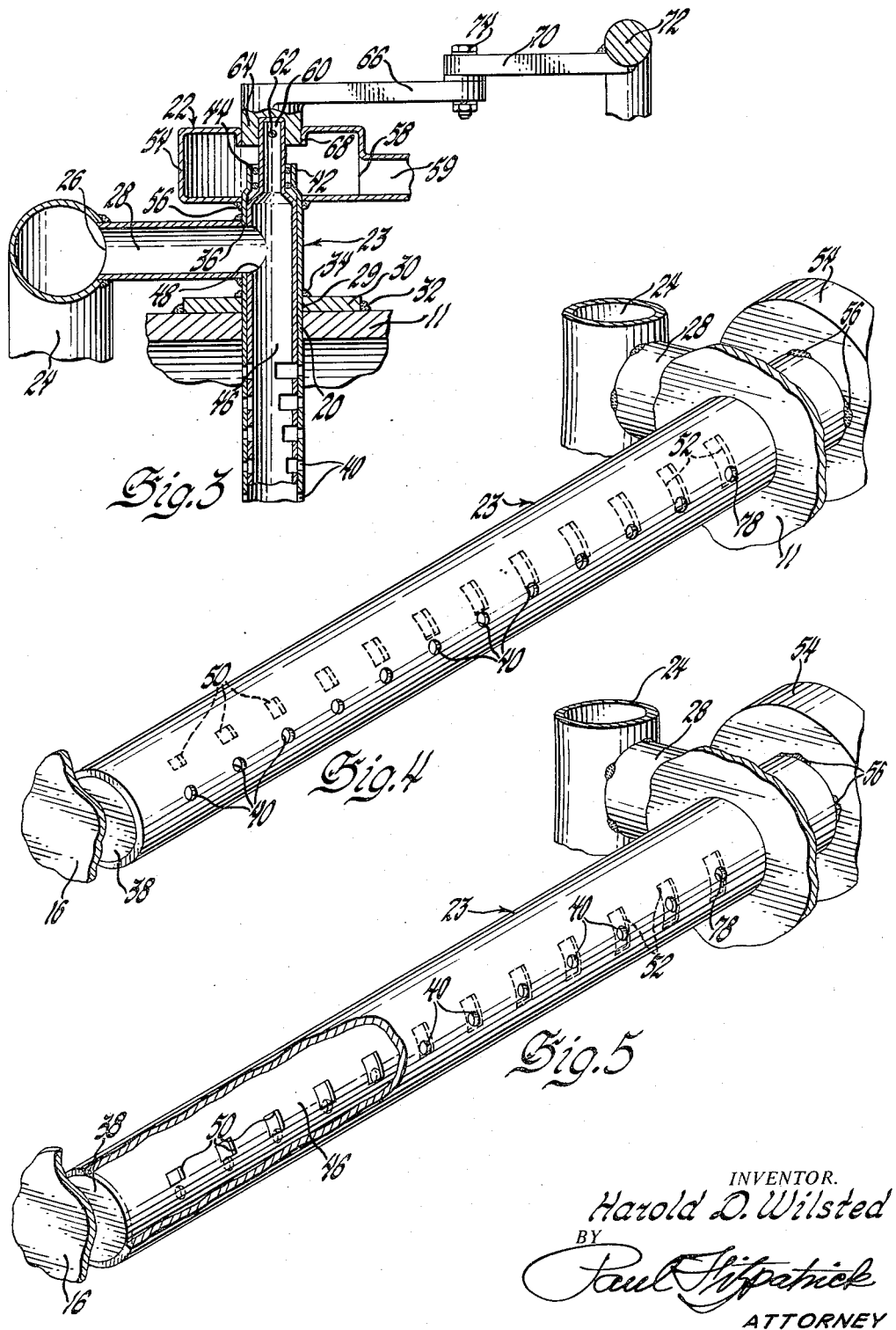

1

2,993,338
FUEL SPRAY BAR ASSEMBLY
Harold D. Wilsted, Indianapolis, Ind., assignor to General Motors Corporation, Detroit, Mich., a corporation of Delaware
Filed Apr. 9, 1958, Ser. No. 727,494
11 Claims. (Cl. 60—39.74)

This invention relates to an afterburner for use with a gas turbine engine ramjet or other through flow combustion engine.

Jet engines are now equipped with afterburners which must be capable of providing modulated thrust augmentation throughout the flight spectrum. Basically, afterburner thrust modulation can be accomplished in one of two ways or a combination of both. First, the local fuel-air ratio in a portion of the combustion chamber can be varied between the limits of lean and rich blowout. Second, the area of the combustion chamber used for burning can be varied. This invention relates to an afterburner fuel spray bar providing modulation by a combination of both methods.

This invention in its preferred form accomplishes the above-mentioned purpose by providing a series of circumferentially spaced single spray bar assemblies mounted on the outer case of the engine, all in the same radial plane, and projecting into the afterburner section. Each assembly consists of a solitary radially apertured casing having ported rotary valve means therein with the ports and apertures radially aligned. The ports are circumferential and of a size increasing in length in proportion to the radial distance from the casing so that the ports are progressively aligned with the casing openings to progressively and cumulatively increase the zone or area of fuel spray in the afterburner combustion chamber upon progressive rotation of the valve means.

Therefore, it is an object of this invention to provide an afterburner fuel spray bar assembly that varies the fuel flow to and zone or area of distribution of the fuel in the combustion chamber as a function of the rotation of a ported valve means and the radial depth of the ports from one end of the spray bar assembly.

Other features, advantages and objects will become apparent by reference to the detailed description and drawings wherein there is shown a preferred embodiment of this invention.

FIGURE 1 is a diagrammatic illustration of a portion of a gas turbine engine.

FIGURE 2 is an enlarged cross-sectional view of a portion of the engine obtained by passing a plane through the FIGURE 1 construction as indicated by the line 2—2.

FIGURE 3 is an enlarged cross-sectional view obtained by passing a plane through the FIGURE 2 construction as indicated by line 3—3, and FIGURES 4 and 5 are enlarged perspective views of the spray bar assembly embodying this invention illustrating the rotary valve means in different positions of rotation.

Referring now to the drawings and more particularly to FIGURE 1, there is shown therein diagrammatically the rear portion of a gas turbine engine 10 having a case 11 enclosing an afterburner section 12 cooperating with an exhaust nozzle 14. Shown in the afterburner section 12 is the cone-shaped end 16 of the turbine section and the conventional afterburner flame holder 18. Projecting through a number of holes or apertures 20 provided in the engine case 11 adjacent the afterburner section are a number of fuel spray bar assemblies 22 forming the subject of this invention.

Referring now more in detail to FIGURES 2 and 3, the spray bar assembly includes an annular fuel manifold 24 surrounding the engine casing at the afterburner section and provided with a number of apertures or holes 26 equally spaced circumferentially of the casing. Cooperating with the holes 26 are a number of tubular fuel conduit means 28 open at both ends, one end of each inserted into openings 26 and welded or brazed thereto, with the other end of each being connected to one of the fuel spray bars 22. Each of the spray bars comprises a single sheet metal tubular casing 23 extending radially through the opening 20 in the engine case and through an opening 29 in a thin reinforcing plate 30, and is secured thereto in a vertical position by suitable welds 32 and 34. The casing 23 is apertured at 36 for the connection with the conduit means 28 and is welded or brazed thereto. Casing 23 is closed at its inner end 38 and is provided with a number of openings or orifices 40 of the same size equally spaced radially from the closed end of the casing for the passage therethrough of fuel from the fuel manifold 24 into the afterburner section to be burned therein. The radial disposition of the spray bar assembly assures that the fuel will be delivered through the openings 40 generally parallel to the gas flow through the afterburner section. The upper end 42 of each casing 23 is reduced in diameter and has mounted therein a number of vertical bearings and seal means 44 for rotatably mounting therein a tubular sleeve valve means 46, the valve means 46 being provided with a fuel supply opening 48 connecting with the fuel conduit means 28 and the opening 36 in the casing 23.

A number of circumferential ports 50 are provided along each of the valve means 46, the ports being equally spaced radially from the end 38 of the casing to correspond to the spacing of the openings 40 in the casing. The ports 50 and openings 40 are thus aligned radially with each other at all times. The ports 50 are of varying circumferential lengths, the port openings increasing in length with an increase in the distance from the end 38 of the casing so that the largest port 52 is provided closest to the connection with the fuel conduit means 28 and the engine casing 11.

The upper end 42 of each of the casings 23 extends into a rectangularly-shaped fuel collector manifold 54 shown in FIGURES 2 and 3, and is welded thereto at 56. The collector manifold is closed as shown except for an opening 58 connecting with an axial conduit 59 leading outboard of the engine, and is adapted to pass overboard any fuel leaking through the end 42 of the casing past the bearings and seal 44.

The upper end 60 of each of the sleeve valve means 46 is reduced in size and extends through the collector manifold as shown in FIGURE 3 to be secured by a pin connection 62 to a boss or bushing 64 formed on a lever 66. As shown, the bushing 64 is rotatably journaled and seated in a suitable depression 68 in the collector manifold. The lever 66 is adapted to be rotated in either direction to rotate sleeve valve means 46 to selectively align or misalign the ports 50 with the casing openings 40. Each lever 66 is pivoted to an arm 70 formed as a projection of a single operating or actuating ring 72 extending around the engine casing as seen in FIGURES 1 and 2. Each of the levers 66 and corresponding arms 70 are connected by a pivot pin 74. The actuating ring 72 is connected at one point to a Bowden wire 76 (FIGURE 1) or other suitable actuating device that in turn may be connected to either a manual control operated by the operator, or to an automatic control mechanism (not shown).

The entire assembly therefore is supported by the engine case 10 and plate 30 by the casing 23 being welded thereto.

Referring now to the operation of this invention, before fire-up, the operating or actuating ring 72 will be in a position such that all of the ports 50 will be rotated out of position with respect to the casing orifices 40 so that no fuel is delivered from the fuel manifold 24 to the afterburner combustion chamber even though the fuel manifold and spray bars are filled. Upon fire-up, and upon movement of the Bowden wire 76 by either manually operated means or automatic means, the ring 72 will rotate lever 70 to pivot lever 66 thereabout and begin rotating the sleeve valve means 46 in the casing 23. As seen in FIGURE 4, rotation of the sleeve valve will first connect the radially outermost casing opening 78 to the outermost and largest port 52 to initially deliver fuel to the afterburner chamber through this opening only. This will provide a thin layer of fuel spray adjacent the engine casing, thereby providing a lean fuel-air mixture and a small area of distribution of the fuel spray. Continued movement of the actuating ring 72 in the same direction will progressively connect more and more of the casing openings 40 and ports 50, the number of openings and ports connected being in proportion to the degree of rotation of the actuating ring. The progressively connected ports and openings therefore progressively increase the fuel-to-air mixture and progressively increase radially the zone or area of distribution of the fuel spray in the combustion chamber as will be clear by referring to FIGURE 5. In FIGURE 5, it will be seen that the ports 50 are made of progressively decreasing circumferential length in proportion to the increase in radial depth from the engine case 11, so that once the ports 50 are connected to the casing openings 40, they remain connected and the fuel flow and zone area of distribution is progressively and cumulatively increased radially until all of the ports are connected to the casing openings 40 and the area of distribution of the fuel spray is at its maximum, traversing the entire afterburner combustion chamber.

The invention thus initially varies the fuel flow and zone of distribution of the fuel from a lean fuel-air ratio with a small area of distribution to a optimum fuel-air ration and a complete distribution of the fuel spray. This provides an infinitely variable spray bar assembly by the use of a single casing with a single rotatable valve means therein.

The use of a single spray bar assembly thus provides simplicity of construction, has a minimum weight and a minimum aerodynamic drag thereon. Such a construction further provides maximum cooling of the assembly since the entire spray bar is cooled by fuel flowing through the bar. This invention further provides better fuel atomization at low fuel flows for a given limiting fuel pump pressure.

While the extent of the openings of ports 50 of the sleeve valve means 46 is shown as decreasing in circumferential length with an increase in the radial distance towards the axis of the engine, it will be clear that the ports could be constructed to decrease in length from the axis radially outwardly towards the engine case without departing from the scope of the invention.

From the foregoing it will be seen that this invention provides a fuel spray bar assembly that controls the fuel flow and area or zone of distribution thereof in accordance with and in proportion to the rotation of a single valve means and the radial distance from one end of the valve.

The description herein of the preferred embodiment of the invention for the purpose of illustrating the principles thereof is not to be considered as limiting the invention, since many modifications thereof within the scope of the invention will occur to those skilled in the art.

I claim:

1. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, longitudinally extending hollow conduit means extending through said opening into said hollow chamber, means securing said conduit means to said casing, said conduit means being closed at one end, means connecting said fuel manifold and said conduit means, said conduit means having a plurality of longitudinally spaced openings communicating with said hollow chamber, and longitudinally extending valve means rotatably mounted within said conduit means controlling the flow of fuel from said manifold through said conduit means openings into said hollow chamber, said valve means comprising a hollow cylinder having a plurality of longitudinally spaced ports, said ports corresponding in number to the number of openings in said conduit means, said ports being aligned longitudinally with said longitudinally spaced openings, said ports progressively decreasing in size with and increase in the radial distance from the connection of said valve means to said fuel manifold, and means for rotating said valve means to progressively and cumulatively align said ports with said openings, continued rotation of said valve means progressively and cumulatively increasing the admission of fuel from said manifold to said chamber through said openings.

2. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, said fuel spray bar assembly projecting through said opening into said hollow chamber, and means connecting said manifold and said spray bar assembly for communicating fuel from said manifold to said chamber, said spray bar assembly comprising a longitudinally extending tubular closed end member having a plurality of longitudinally spaced openings connecting the fuel in the interior of said member with said chamber, and movable longitudinally extending sleeve valve means within said tubular member, said sleeve valve means having a plurality of ports longitudinally spaced in accordance with the spacing of said openings so as to be longitudinally aligned therewith, said ports progressively decreasing in size with an increase in the radial distance from said casing, movement of said sleeve valve means to one position moving said ports out of alignment with said openings blocking the communication of fuel to said chamber, movement of said sleeve valve means to another position progressively and cumulatively aligning said ports with said openings to progressively and cumulatively increase the communication of fuel to said chamber from said manifold.

3. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, moveable longitudinally extending valve means extending through said opening into said chamber, and means connecting said manifold and said valve means, said movable valve means having a plurality of longitudinally spaced openings progressively increasing in size from one end of said valve means towards its other end, means also extending through said opening surrounding said valve means having a number of longitudinally spaced openings longitudinally aligned with said valve openings, movement of said valve means to one position positioning said valve openings out of alignment with said other openings, movement of said valve means to another position progressively and cumulatively aligning said valve openings with said other openings to progressively and cumulatively increase the communication of fuel to said chamber.

4. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, said fuel spray bar assembly projecting through said opening into said hollow chamber, and means connecting said manifold and said spray bar assembly for communicating fuel from said manifold to said chamber, said spray bar assembly comprising a longitudinally extending tubular closed end member having a plurality of longitudinally spaced openings connecting the fuel in the interior of said member with said chamber, and longitudinally extending rotatable sleeve valve means within said tubular member, said sleeve valve means having a similar number of equally spaced longitudinally aligned ports of varying circumferential lengths cooperating with said openings for the admission of fuel therethrough to said chamber, said ports progressively decreasing in circumferential lengths with an increase in the radial distance from said casing, rotation of said valve member cumulatively increasing the admission of fuel into said chamber.

5. A fuel spray bar for use in connection with the combustion section of a through-flow combustion engine having a casing defining a chamber for the combustion of fuel therein, a fuel manifold surrounding said casing containing fuel under pressure, said casing having an opening therein, said fuel spray bar extending through said opening into said chamber, means connecting said fuel manifold and said spray bar, said spray bar consisting of a longitudinally extending casing having a number of longitudinally spaced openings, a rotatable sleeve valve within said casing having a number of ports longitudinally spaced in accordance with the spacing of said openings, said ports having a size progressively decreasing in a direction away from said casing, progressive rotation of said sleeve valve member to one position progressively and cumulatively admitting fuel into said chamber, rotation of said member to said one position progressively and cumulatively aligning all of said ports with said openings.

6. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, said fuel spray bar assembly projecting through said opening into said hollow chamber, and means connecting said manifold and said spray bar assembly for communicating fuel from said manifold to said chamber, said spray bar assembly comprising a longitudinally extending tubular closed end member having a plurality of longitudinally spaced openings connecting the fuel in the interior of said member with said chamber, and rotatable sleeve valve means within said tubular member, said sleeve valve means having a similar number of equally spaced longitudinally aligned ports cooperating with said openings for the admission of fuel therefrom to said chamber, said ports progressively decreasing in size with an increase in the radial distance from said casing, the radial extent of the zone of fuel spray in said chamber varying cumulatively as a function of the continued rotation of said valve member.

7. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, said fuel spray bar assembly projecting through said opening into said hollow chamber, and means connecting said manifold and said spray bar assembly for communicating fuel from said manifold to said chamber, said spray bar assembly comprising a longitudinally extending tubular closed end member having a plurality of longitudinally spaced openings connecting the fuel in the interior of said member with said chamber, and rotatable sleeve valve means within said tubular member, said sleeve valve means having a similar number of equally spaced longitudinally aligned ports cooperating with said openings for the admission of fuel therefrom to said chamber, said ports progressively increasing in size with an increase in the radial distance from one end of said tubular member, rotation of said valve means progressively and cumulatively increasing the admission of fuel into said chamber.

8. A fuel spray bar assembly for use in connection with the combustion section of a through-flow combustion engine having a casing defining a chamber for the combustion of fuel therein, a fuel manifold surrounding said casing containing fuel under pressure, said casing having an opening therein, said fuel spray bar extending through said opening into said chamber, means connecting said fuel manifold and said spray bar, said spray bar consisting of a longitudinally extending closed end casing having a number of longitudinally spaced openings, a rotatable sleeve valve within said spray bar casing having a number of ports longitudinally spaced in accordance with the spacing of said openings, said ports having a size progressively increasing in a direction away from said closed end, progressive rotation of said sleeve valve means to one position progressively and cumulatively admitting fuel into said chamber by progressively and cumulatively aligning all of said ports with said openings.

9. A fuel spray bar assembly for use in connection with the combustion section of a through-flow combustion engine having a casing defining a hollow chamber for the combustion of fuel therein, a fuel manifold surrounding said casing containing fuel under pressure, said casing having an opening therein, said fuel spray bar assembly projecting through said opening into said hollow chamber, and means connecting said manifold and said spray bar assembly for communicating fuel from said manifold to said chamber, said spray bar assembly comprising a longitudinally extending tubular closed end member having a plurality of longitudinally spaced openings connecting the fuel in the interior of said member with said chamber, and rotatable sleeve valve means within said tubular member, said sleeve valve means having a similar number of equally spaced longitudinally aligned ports cooperating with said openings for the admission of fuel therefrom to said chamber, said ports progressively increasing in size with an increase in the longitudinal distance from one end of said tubular member, the radial zone of fuel spray in said chamber varying as a function of the continued rotation of said valve member.

10. A fuel spray bar assembly for use in connection with the combustion section of a through-flow combustion engine having a casing defining a hollow combustion chamber, a fuel manifold surrounding said casing containing fuel under pressure, said casing having a plurality of circumferentially spaced openings in the same radial plane, a plurality of longitudinally extending hollow fuel spray bars projecting through said openings into said chamber, and means connecting said fuel manifold and the hollow interior of said spray bars, said spray bars each having a number of longitudinally spaced orifices for the communication of fuel from said manifold to said chamber, and valve means movable in said spray bars having a plurality of spaced ports sequentially increasing in size so disposed as to sequentially and cumulatively align with said orifices upon movement of said valve means to control the flow of fuel through said orifices.

11. A fuel spray bar assembly for use in connection with the combustion section of a through-flow combustion engine having a casing defining a hollow combustion chamber, a fuel manifold surrounding said casing containing fuel under pressure, said casing having a plurality of circumferentially spaced openings in the same radial plane, a plurality of longitudinally extending hollow fuel spray bars projecting through said openings into said chamber, and means connecting said fuel manifold and the hollow interior of said spray bars, said spray bars each having a set of longitudinally spaced ports for the communication of fuel from said manifold to said chamber, and valve means movable in said spray bars also having a set of spaced ports, the ports of one of said sets being of a size and so disposed as to sequentially and cumulatively align with the said ports of the other said sets upon movement of said valve means to control the flow of fuel through said ports into said chamber.

References Cited in the file of this patent

UNITED STATES PATENTS

| | | |
|---|---|---|
| 778,934 | Wilson | Jan. 3, 1905 |
| 1,831,522 | Bastian | Nov. 10, 1931 |
| 2,508,420 | Redding | May 23, 1950 |
| 2,659,630 | Angstadt | Nov. 17, 1953 |
| 2,827,928 | Guckel | Mar. 25, 1958 |

FOREIGN PATENTS

| | | |
|---|---|---|
| 200,351 | Australia | Nov. 30, 1955 |